(12) United States Patent
Rogers

(10) Patent No.: US 7,611,187 B1
(45) Date of Patent: Nov. 3, 2009

(54) TARP SYSTEM FOR A SIDE-DUMP TRAILER OR TRUCK

(76) Inventor: Ralph R. Rogers, 841 N. Shay Rd., Dakota Dunes, SD (US) 57049

( * ) Notice: Subject to any disclaimer, the term of this patent is extended or adjusted under 35 U.S.C. 154(b) by 0 days.

(21) Appl. No.: 12/386,241

(22) Filed: Apr. 15, 2009

(51) Int. Cl.
*B60J 11/00* (2006.01)
*B60P 1/04* (2006.01)
(52) U.S. Cl. .................. 296/98; 296/183.2; 298/18
(58) Field of Classification Search .............. 296/98, 296/183.2; 298/18
See application file for complete search history.

(56) References Cited

U.S. PATENT DOCUMENTS

| 5,002,328 | A | 3/1991 | Michel |
| 6,206,449 | B1 | 3/2001 | Searfoss |
| 7,032,950 | B2 | 4/2006 | Eggers et al. |
| 7,111,907 | B2 * | 9/2006 | Boon .......................... 298/18 |

\* cited by examiner

*Primary Examiner*—Joseph D Pape
(74) *Attorney, Agent, or Firm*—Dennis L. Thomte; Thomte Patent Law Office LLC

(57) ABSTRACT

A tarp system for a side-dump trailer or truck is disclosed with the tarp system including forward and rearward swing arms which are pivotally mounted on the pivot pins to which the rod ends of forward and rearward cylinders are connected for pivotally moving the side-dump body from side to side.

3 Claims, 7 Drawing Sheets

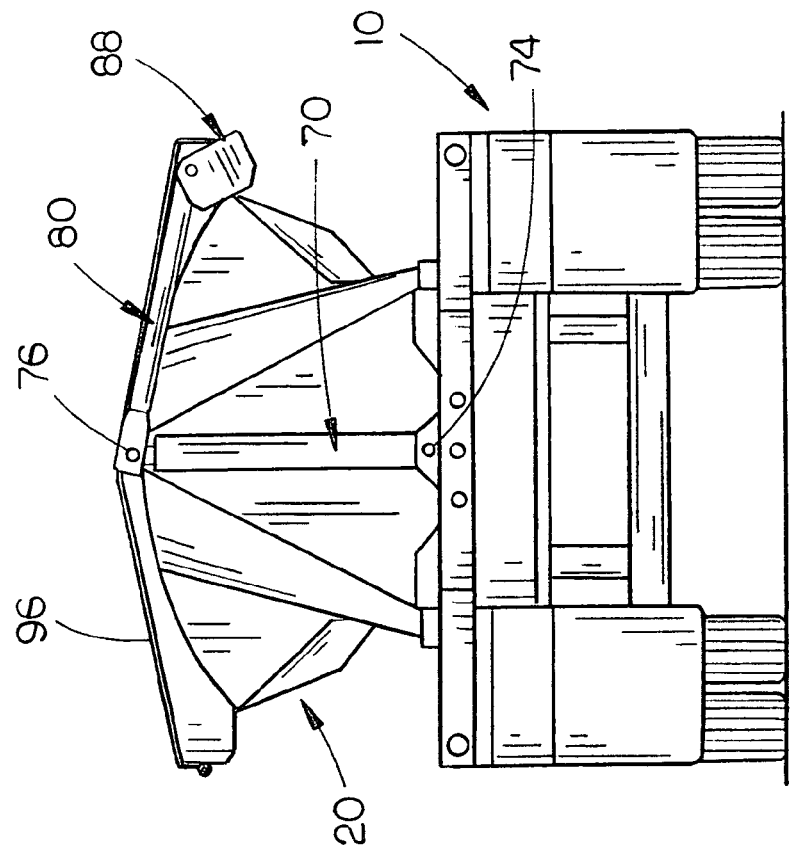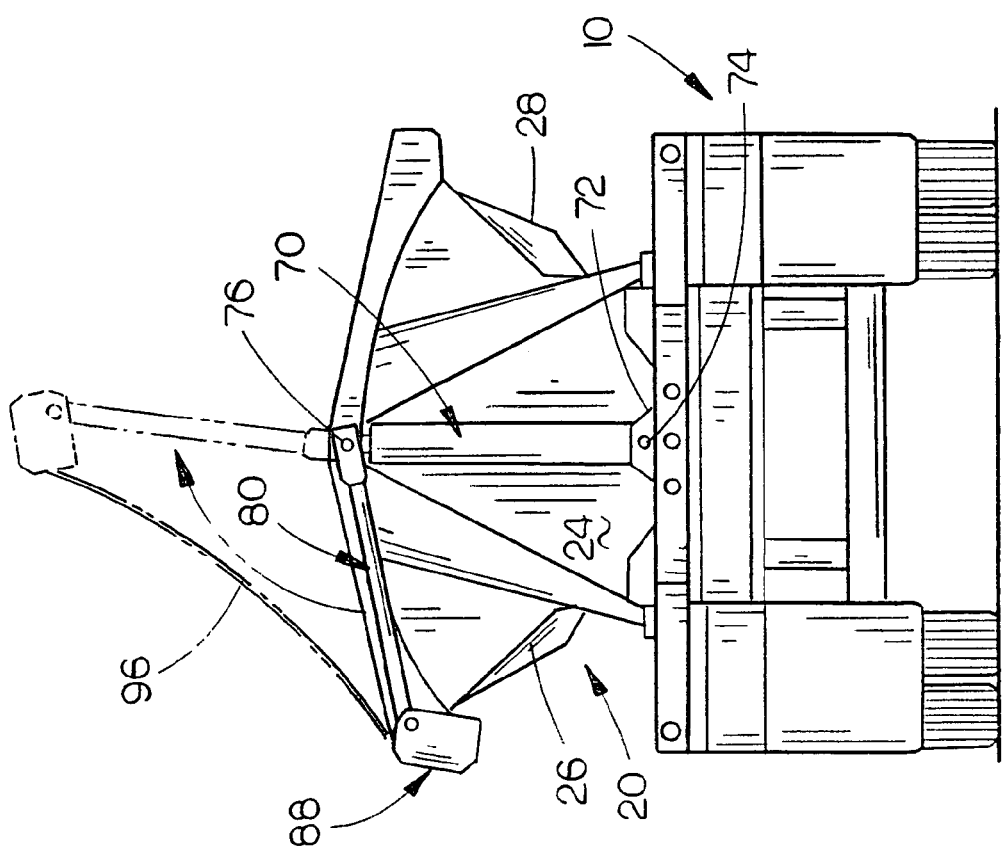

TARP SYSTEM FOR A SIDE-DUMP TRAILER OR TRUCK

BACKGROUND OF THE INVENTION

1. Field of the Invention

This invention relates to a tarp system for a side-dump trailer or truck and more particularly to a tarp system for a side-dump trailer or truck wherein the swing arms of the tarp system are pivotally secured to the forward and rearward ends of the side-dump body by means of the pivot pins which pivotally secure the rod ends of the hydraulic cylinders at the forward and rearward ends of the side dump body to the upper ends of the forward and rearward ends of the body.

2. Description of the Related Art

In recent years, side-dump bodies mounted on trailers or trucks have become extremely popular. The assignee of the instant invention has obtained many patents on side dump bodies with one of the first patents being U.S. Pat. No. 5,480,214 to Ralph Rogers.

Tarp systems have been previously provided for side-dump trailers such as U.S. Pat. Nos. 7,032,950 and 6,206,449. In U.S. Pat. No. 7,032,950, the swing arms thereof are pivotally secured to a spring mount or bracket which is positioned below the upper end of each of the front and rear walls of the side-dump body. In U.S. Pat. No. 6,206,449, the swing arms are connected to an adapter bracket secured to the forward and rearward ends of the side-dump body. The requirement of the spring mount or bracket in U.S. Pat. No. 7,032,950 and the adapter bracket in U.S. Pat. No. 6,206,449 requires additional fabrication steps and adds additional weight to the side-dump body. Further, the fact that the swing arms have their inner or lower ends positioned considerably below the upper ends of the forward and rearward end walls of the side-dump body restricts their reach. This is particularly true when the side-dump body has extenders at the upper ends thereof, such as disclosed in the pending application Ser. No. 12/072,646 filed Feb. 27, 2008 entitled A SIDE-DUMP BODY HAVING AN INCREASED CARRYING CAPACITY. The swing arms of the prior art are not believed to be capable to move a tarp over the upper ends of a side-dump body having extenders extending upwardly from the upper edges thereof.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A tarp system is described for a side-dump body mounted on a trailer or truck. The side-dump trailer or truck comprises an elongated wheeled frame having a forward end, a rearward end, and opposite sides. A first support is mounted on the wheeled frame adjacent the forward end thereof at one side thereof. A second support is mounted on the wheeled frame adjacent the rearward end thereof at one side thereof. A third support is mounted on the wheeled frame adjacent the forward end thereof at the other side thereof. A fourth support is mounted on the wheeled frame adjacent the rearward end thereof at the other side thereof.

An elongated body is movably positioned on the wheeled frame and has a forward end, a rearward end and opposite sides. The body includes a bottom having a forward end and a rearward end. The body includes an upstanding forward wall member with upper and lower ends, an upstanding rearward wall member with upper and lower ends, a first side wall having an upper end, and a second side wall having an upper end. The body has an open upper end for receiving material to be transported.

A first pivot pin is secured to the first side of the body adjacent the forward end thereof adapted to be removably and pivotally received by the first support. A second pivot pin is secured to the first side of the body adjacent the rearward end thereof adapted to be removably and pivotally received by the second support. A third pivot pin is secured to the second side wall of the body adjacent the forward end thereof adapted to be removably and pivotally received by the third support. A fourth pivot pin is secured to the second side wall of the body adjacent the rearward end thereof adapted to be removably and pivotally received by the fourth support. First, second, third and fourth locking devices are selectively movable between locked and unlocked positions for selectively maintaining the first, second, third and fourth pivot pins in the first, second, third and fourth supports respectively when in their locked position. The side-dump trailer also includes a first power cylinder having a base end pivotally secured to the wheeled frame by a fifth pivot pin intermediate the sides thereof forwardly of the body and a rod end which is pivotally secured to the forward wall member adjacent the upper end thereof by a sixth pivot pin. A second power cylinder is also provided which has a base end pivotally secured to the wheeled frame by a seventh pivot pin intermediate the sides thereof rearwardly of the body and a rod end which is pivotally secured to the rearward wall member adjacent the upper end thereof by an eighth pivot pin. The power cylinders are adapted to pivot the body, with respect to the wheeled frame, to selectively dump materials therefrom from either side of the side-dump vehicle.

A tarp roll-up system is provided for use with the side-dump body which includes a flexible tarp having a forward end, a rearward end, a first side edge and a second side edge, with the first side edge of the tarp being secured to the side-dump body at one side thereof adjacent the upper end thereof. The tarp roll-up system includes an elongated tube, having forward and rearward ends, with the second side edge of the tarp being secured thereto. The tarp roll-up system also includes an elongated forward swing arm, with first and second ends, and a rearward swing arm, with first and second ends. The forward swing arm is positioned forwardly of the forward wall member of the side-dump body and has its first end operatively pivotally secured to the sixth pivot pin. The rearward swing arm is positioned pivotally of the rearward wall member of the body and has its first end operatively pivotally secured to the eighth pivot pin.

A first selectively reversible motor is secured to the second end of the forward swing arm and has a drive shaft secured to the forward end of the elongated tube for rotating the tube. The tarp roll-up system also includes a second selectively reversible motor secured to the second end of the rearward swing arm and which has a drive shaft secured to the rearward end of the elongated tube for rotating the tube.

The forward and rearward swing arms are movable from a first position wherein the motors thereon are positioned adjacent the one side of the body, with the tarp being rolled upon the elongated tube, to a second position wherein the motors are positioned adjacent the other side of the body with the tarp extending over the upper end of the body.

A spring means is associated with each of the swing arms which yieldably urge the swing arms from their second position to their first position.

It is therefore a principal object of the invention to provide an improved tarp system for a side-dump trailer or truck.

A further object of the invention is to provide a tarp system for a side-dump trailer or truck which includes forward and rearward swing arms with the swing arms being pivotally secured to the pivot pins which secure the rod ends of the associated power cylinders to the forward and rearward ends of the body.

A further object of the invention is to provide a tarp system for a side-dump trailer or truck which enables the same to be used with side-dump trailers or trucks having extenders extending upwardly from the upper end of the side-dump body.

Still another object of the invention is to provide a tarp system for a side-dump trailer or truck which eliminates the costly brackets or the like which are normally utilized to pivotally secure the swing arms of the prior art tarp systems to the side-dump body.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a rear view of the system of FIG. 1 which illustrates the tarp system in its open position with the broken lines illustrating the tarp system being moved to its closed or covered position;

FIG. 4 is a rear view similar to FIG. 2 except that the tarp is in its closed or covered position;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 8:
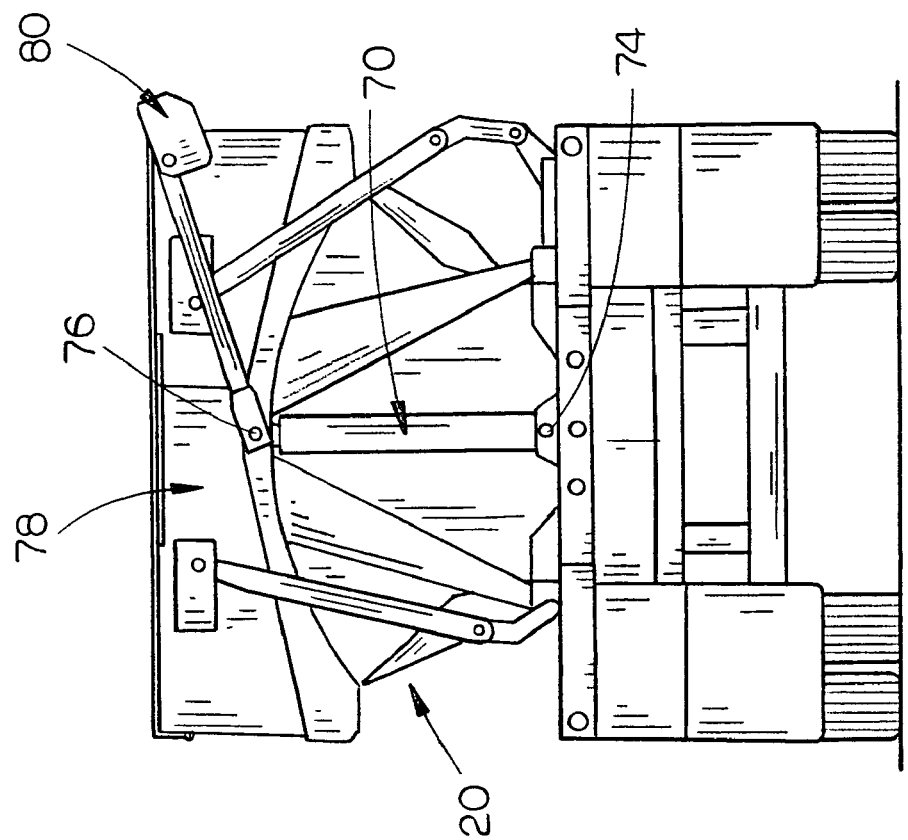
FIG. 8 is a rear view similar to FIG. 3 except that the side-dump trailer is illustrated as having extenders mounted thereon.
Figure 9:
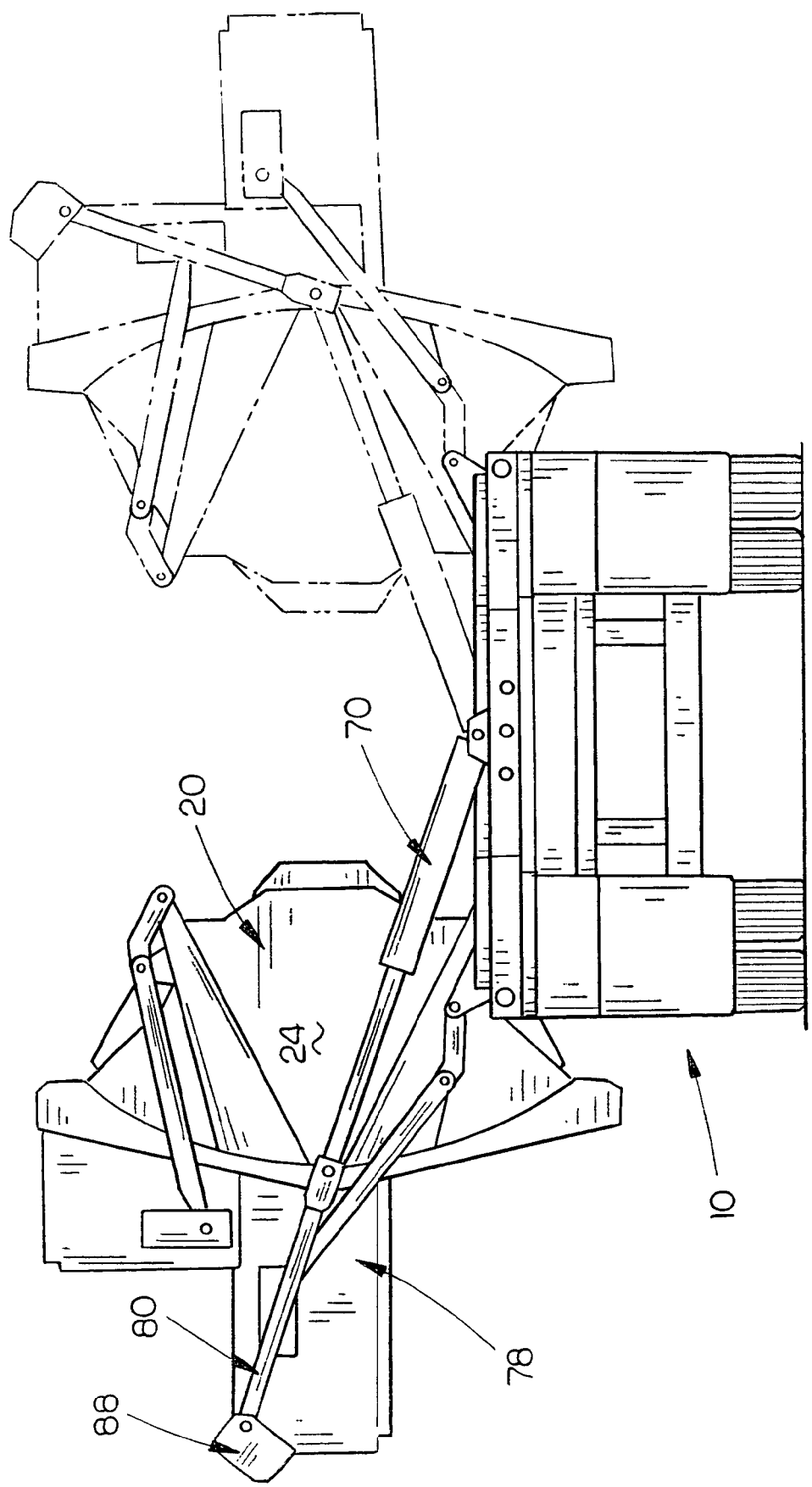
FIG. 9 is a rear view illustrating the side-dump body of FIGS. 6 and 7 being moved to the dump position at the left side of the vehicle with the broken lines illustrating the side-dump body being moved to its dumping position at the right side of the truck or trailer.

In FIGS. 1-6, a side-dump body is illustrated as being mounted on a trailer such as disclosed in U.S. Pat. No. 5,480,214. In FIGS. 7-9, the side-dump trailer has extenders mounted on the upper end thereof as disclosed in U.S. pending application Ser. No. 12/072,646, filed Feb. 27, 2008.

In FIGS. 1-6, the numeral 10 refers generally to a wheeled frame which may be part of a truck or trailer. For purposes of description, the wheeled frame 10 will be described as having a first side 12, a second side 14, a forward end 16 and a rearward end 18. A conventional side-dump body such as disclosed in U.S. Pat. No. 5,480,214 is illustrated in FIGS. 1-6 and is referred to generally by the reference numeral 20. For purposes of description, side-dump body 20 will be described as having a forward end wall 22, a rearward end wall 24, a first side wall 26, a second side wall 28, and a bottom wall 30 which may be curved or flat. Bottom wall 30 may be integrally formed with side walls 26 and 28.

A pivot pin 32 is provided at the forward end of body 20 adjacent side wall 26. Pivot pin 34 is provided at the forward end of body 20 adjacent side wall 28. Pivot pin 36 is secured to the body 20 at the rearward end thereof adjacent side 26 and pivot pin 38 is secured to the body 20 at the rearward end thereof adjacent side wall 28.

Saddle support 40 is secured to frame 10 at the forward end thereof which is adapted to receive the pivot pin 32 therein. A locking device 42 selectively maintains the pivot pin 32 in the saddle support 40. A saddle support 44 is secured to the frame 10 adapted to receive the pivot pin 34 therein. Locking device 46 selectively locks pivot pin 34 into the saddle support 44. Similarly, a saddle support 46 is secured to the frame 10 at the rearward end thereof adapted to receive the pivot pin 36 therein. Locking device 48 selectively locks pivot pin 36 into saddle support 46. A saddle support 50 is secured to the rearward end of the frame 10 and is adapted to receive the pivot pin 38. Locking device 52 selectively locks the pivot pin 38 in the saddle support 50.

The numeral 54 refers to a hydraulic cylinder which has its lower end 56 pivotally secured to the forward end of frame 10 at 58 by means of pivot pin 60. The rod end 62 of hydraulic cylinder 54 is pivotally secured or mounted on the pivot pin 64 which extends forwardly from the upper end of the forward wall member 22. Pivot pin 64 has an opening or bore 66 formed therein adapted to receive key 68.

The numeral 70 refers to a hydraulic cylinder which is positioned at the rearward end of the side-dump body and which has its base end secured to the frame 10 at 72 by pivot pin 74. The rod end of hydraulic cylinder 70 is pivotally secured to a pivot pin 76 which extends rearwardly from the upper end of rearward wall member 24.

The side-dump body of FIGS. 1-6 is selectively pivotally movable in conventional fashion so as to be able to discharge the contents of the side-dump body to either side of the frame 10 in conventional fashion such as disclosed in U.S. Pat. No. 5,480,214, the disclosure of which is herein incorporated by reference.

FIGS. 7-9 illustrate a conventional side-dump body such as disclosed in U.S. Pat. No. 5,480,214 but which has extenders or an extension wall apparatus on the upper end of the side-dump body as disclosed in the co-pending application Ser. No. 12/072,646 filed Feb. 27, 2008, the disclosure of which is incorporated herein by reference. The extenders or wall extension apparatus is referred to generally by the reference numeral 78.

The numeral 80 refers to a rear swing arm assembly of the tarp system 82 of this invention. Swing arm assembly 80 has an opening 84 at one end thereof which receives the pivot pin 76 to enable the swing arm assembly 80 to be pivotally moved from the solid line position of FIG. 7 to the solid line position of FIG. 8. The numeral 86 refers to a spring which is mounted on the pivot pin 76 and which is connected to the swing arm 80 which yieldably resists the movement of the swing arm assembly 80 from its position of FIG. 8 to its position of FIG. 7 as will be described in more detail hereinafter. The numeral 88 refers to an electric motor which is pivotally mounted on the other end of the swing arm assembly 80 by pin 90 and which has a drive shaft 92 extending therefrom. The electric motor 88 is a 12-volt DC motor and is selectively reversible. The power shaft or drive shaft 92 of motor 88 is connected to an elongated tube 94 which extends from one end of the side-dump body to the other end thereof and which has the flexible tarpaulin or tarp 96 wound thereon when the swing arm assembly 80 is in the position of FIG. 6. The side edge 98 of the tarp 96 is secured to a rod 98 which is fixed to the upper end of the side wall 26. The rod 98 is supported upon a plurality of spaced-apart stops 100 which limits the roll-up of the tarp 96. An identical swing arm assembly 80' is pivotally secured to the pivot pin 64 at the forward end of the side-dump body and is referred to generally by the reference numeral 80'.

Figure 1:
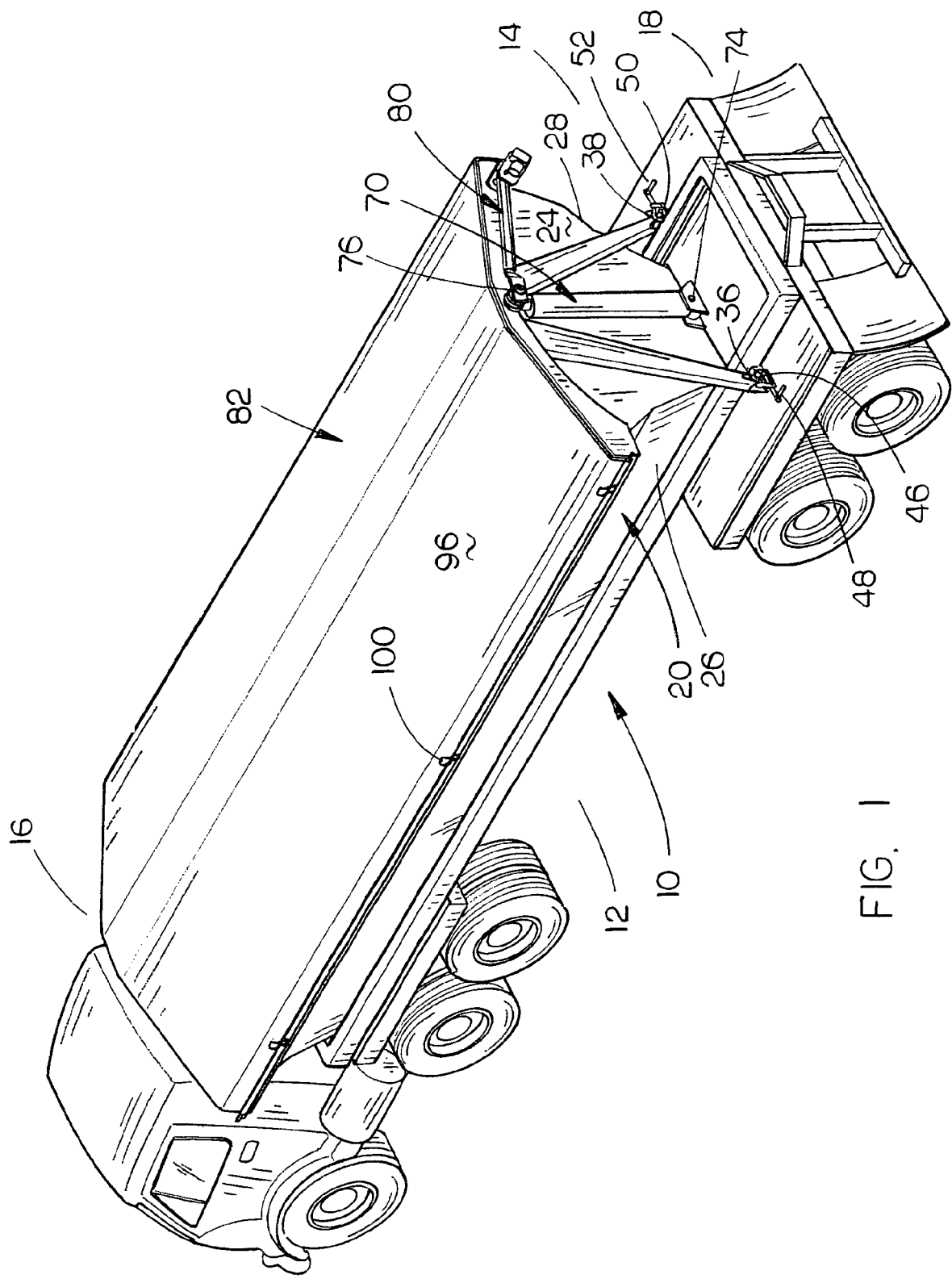
FIG. 1 is a rear perspective view of a conventional side-dump trailer having the tarp system of this invention mounted thereon with the tarp being illustrated in its covered position.
Figure 2:
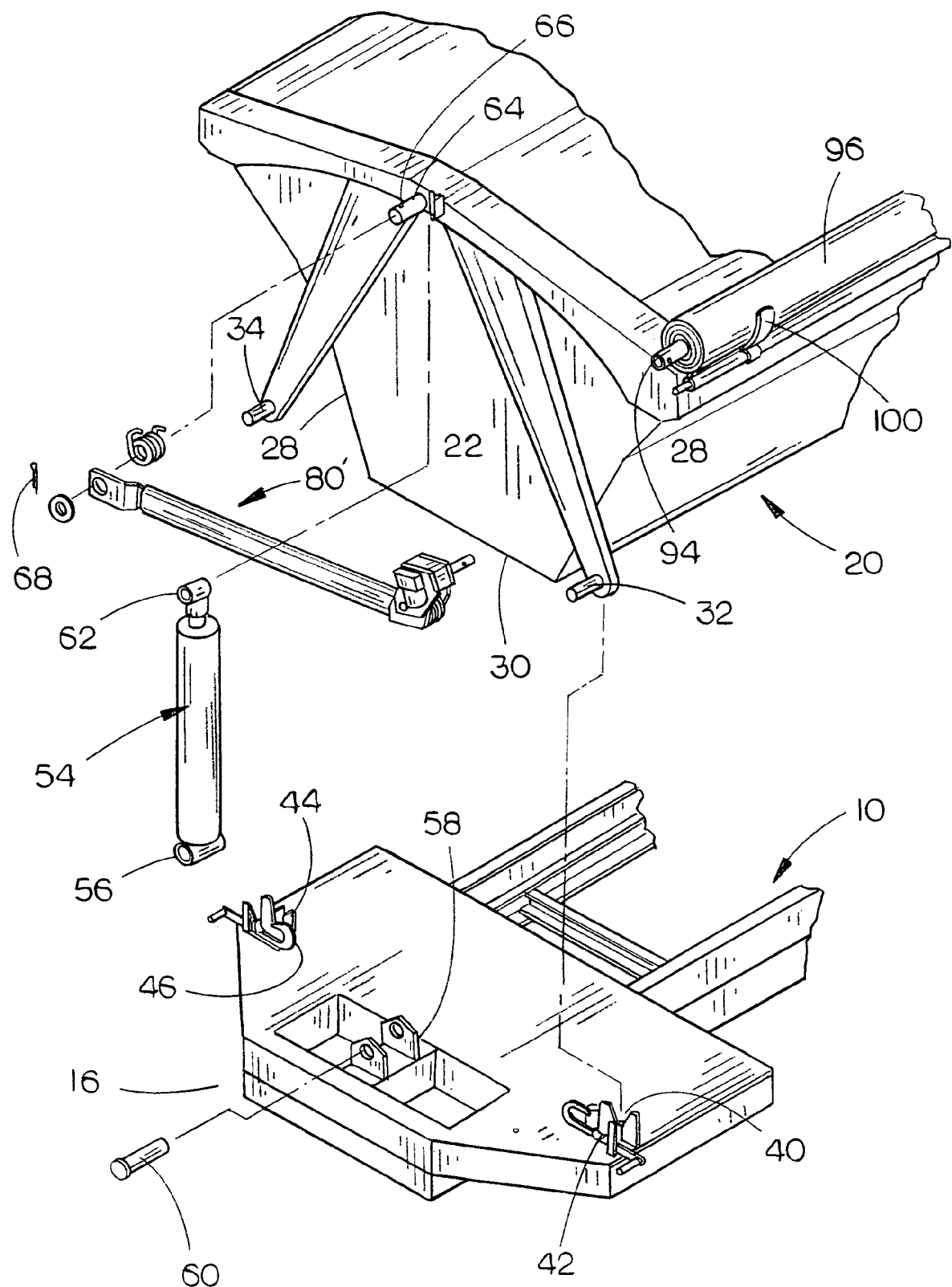
FIG. 2 is a partial front exploded perspective view of the side-dump body with the tarp being in its rolled-up position.
Figure 5:
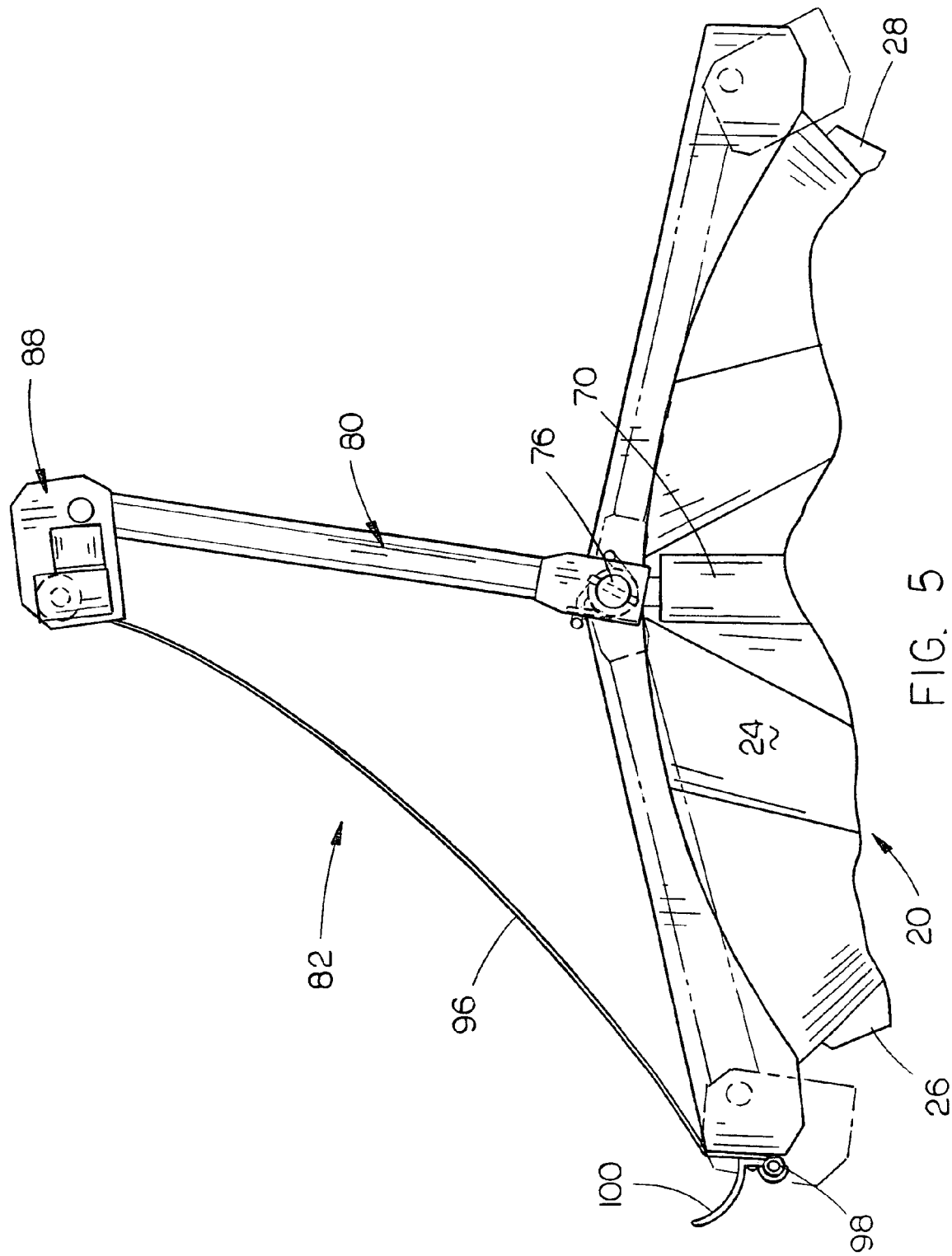
FIG. 5 is a partial rear view of the tarp system of FIG. 1 which illustrates the tarp being pulled across the upper end of the side-dump body.
Figure 6:
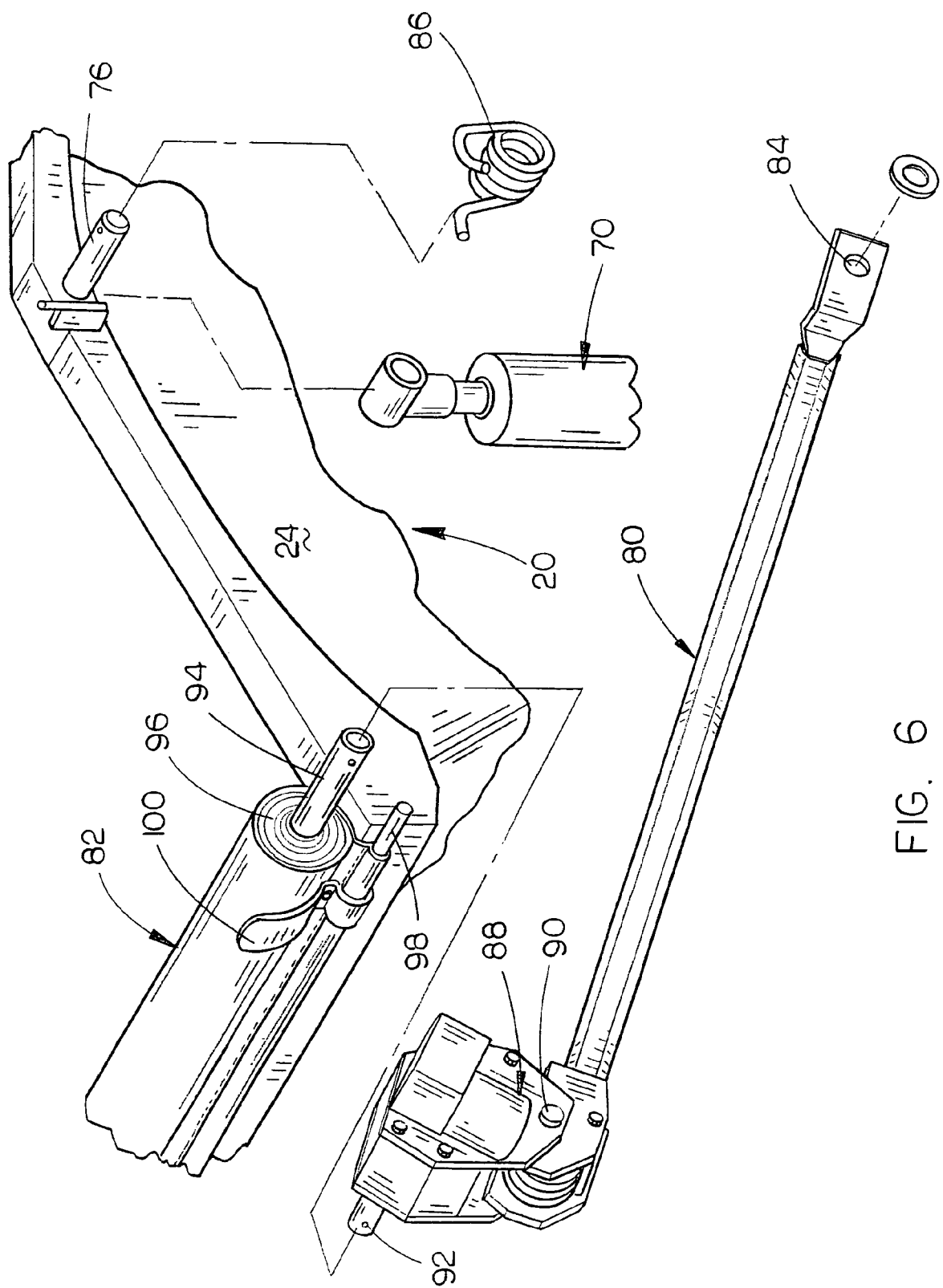
FIG. 6 is a partial exploded rear perspective view of a portion of the tarp system of FIGS. 1-4.
Figure 7:
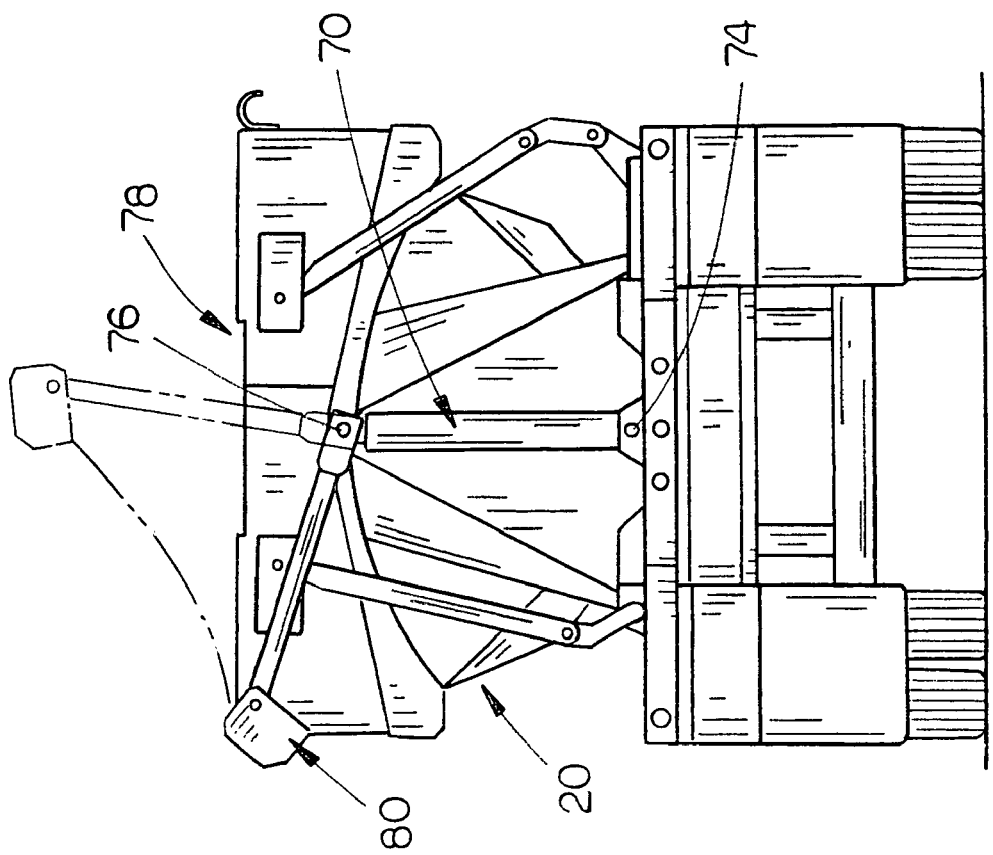
FIG. 7 is a rear view similar to FIG. 2 except that the side-dump body has extenders mounted on the upper end thereof.

When materials are to be dumped into the upper end of the side-dump body 20, the tarp 96 will be in its rolled-up position of FIGS. 6 and 7. When it is desired to place the tarp over the side-dump body, the drive shaft 92 of the motor 88 is operated in a counter-clockwise position as viewed in FIG. 6 so that the spring 86 will cause the swing arm assembly 80 to pivotally move on the pivot pin 76 from the position of FIG. 7 to the position of FIG. 8. The swing arm assembly 80 is moved from the position of FIG. 7 to the position of FIG. 8 until the other end of the tarp extends over the upper edge of the side wall 28.

When it is desired to roll up the tarp 96, the motor 88 is reversed which causes the tube 94 to be rotated so that the tarp is wound upon the tube or pipe 94. As the swing arm assembly 80 is moved from the position of FIG. 8 to the position of FIG. 7, the spring 86 will be tightened to enable it to assist the tarp to be moved from its rolled-up position to its covered position during the next covering sequence. The swing arm assembly 80' will be simultaneously moved with the swing arm assembly 80. The swing arm assemblies 80 and 80' are conventional and are marketed under the trademarks Smooth Roll™ by Sioux City Tarp Inc. of Sioux City, Nebr.

The only difference between what has been just described and that of the prior art is that in the instant invention the swing arm assemblies 80 and 80' are pivotally mounted on the pivot pins 76 and 64 respectively rather than on some mounting bracket assembly secured to the ends of the side-dump body at a point much lower than the position of the pivot pins 76 and 64. The fact that the swing arm assemblies 80 and 80' are secured to the pivot pins 76 and 66 respectively enables the swing arm assemblies to have a greater reach so that they may be used in conjunction with the wall extender or extension wall apparatus 78. The fact that the swing arm assemblies 80 and 80' are secured to the pivot pins 76 and 64 gives the swing arm assemblies a much greater reach than previously possible.

Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A side-dump vehicle, comprising:
an elongated wheeled frame having a forward end, a rearward end, and opposite sides;
a first support on said wheeled frame adjacent the forward end thereof at one side thereof;
a second support on said wheeled frame adjacent the rearward end thereof at one side thereof;
a third support on said wheeled frame adjacent the forward end thereof at the other side thereof;
a fourth support on said wheeled frame adjacent the rearward end thereof at the other side thereof;
an elongated body movably positioned on said wheeled frame and having a forward end, a rearward end, opposite sides, and an open upper end for receiving materials to be transported;
said body including a bottom having a forward end and a rearward end;
said body also including an upstanding forward wall member with upper and lower ends, an upstanding rearward wall member with upper and lower ends, a first side wall having an upper end, and a second side wall having an upper end;
a first pivot pin secured to said first side wall of said body adjacent the forward end thereof adapted to be removably and pivotally received by said first support;
a second pivot pin secured to said first side wall of said body adjacent the rearward end thereof adapted to be removably and pivotally received by said second support;
a third pivot pin secured to said second side wall of said body adjacent the forward end thereof adapted to be removably and pivotally received by said third support;
a fourth pivot pin secured to said second side wall of said body adjacent the rearward end thereof adapted to be removably and pivotally received by said fourth support;
locking devices selectively movable between locked and unlocked positions for selectively maintaining said first, second, third and fourth pivot pins in said first, second, third and fourth supports respectively when in their locked positions;
a first power cylinder having a base end pivotally secured to said wheeled frame by a fifth pivot pin intermediate the sides thereof forwardly of said body and a rod end pivotally secured to said forward wall member adjacent the upper end thereof by a sixth pivot pin;
a second power cylinder having a base end pivotally secured to said wheeled frame by a seventh pivot pin intermediate the sides thereof rearwardly of said body and a rod end pivotally secured to said rearward wall member adjacent the upper end thereof by an eighth pivot pin;
said power cylinders adapted to pivot said body, with respect to said wheeled frame, to selectively dump materials therefrom from either side of the side-dump vehicle;
a tarp roll-up system for a flexible tarp having a forward end, a rearward end, a first side edge and a second side edge with the first side edge being secured to said body at one side thereof;
said tarp roll-up system including an elongated tube, having forward and rearward ends with the second side edge of the tarp being secured thereto;

said tarp roll-up system also including an elongated forward swing arm, with first and second ends, and a rearward swing arm, with first and second ends;

said forward swing arm being positioned forwardly of said forward wall member of said body and having its said first end operatively pivotally secured to said sixth pivot pin;

said rearward swing arm being positioned rearwardly of said rearward wall member of said body and having its first end operatively pivotally secured to said eighth pivot pin;

a first selectively reversible motor secured to said second end of said forward swing arm and having a drive shaft secured to said forward end of said elongated tube for rotating said tube;

a second selectively reversible motor secured to said second end of said rearward swing arm and having a drive shaft secured to said rearward end of said elongated tube for rotating said tube;

said forward and rearward swing arms being movable from a first position wherein said motors are positioned adjacent said one side of said body with the tarp being rolled upon said elongated tube, to a second position wherein said motors are positioned adjacent the other side of said body with the tarp extending over the upper end of said body; and spring means associated with each of said swing arms which yieldably urge said swing arms from their said first position to their said second position.

2. The structure of claim 1 wherein the vehicle comprises a trailer.

3. In combination;

a side-dump body, having upstanding forward and rearward ends and first and second sides, mounted on a wheeled frame;

a forward power cylinder having its base end pivotally secured to said wheeled frame forwardly of said side-dump body by a first pivot pin, and its rod end pivotally secured to said forward end of said side-dump body at the upper end thereof by a second pivot pin;

a rearward power cylinder having its base end pivotally secured to said wheeled frame rearwardly of said side-dump body by a third pivot pin and its rod end pivotally secured to the rear end of said side-dump body at the upper end thereof by a fourth pivot pin;

a tarp adapted to be extended over said side-dump body; and a tarp roll-up mechanism including forward and rearward swing arms which are pivotally mounted on said second and fourth pivot pins respectively.

* * * * *